United States Patent
Watanabe et al.

(10) Patent No.: US 7,869,329 B2
(45) Date of Patent: Jan. 11, 2011

(54) OPTICAL INFORMATION RECORDING AND REPRODUCING APPARATUS

(75) Inventors: Mitsuru Watanabe, Hachioji (JP); Akira Kunimoto, Hino (JP)

(73) Assignee: Konica Minolta Opto, Inc., Tokyo (JP)

(*) Notice: Subject to any disclaimer, the term of this patent is extended or adjusted under 35 U.S.C. 154(b) by 236 days.

(21) Appl. No.: 12/188,846

(22) Filed: Aug. 8, 2008

(65) Prior Publication Data

US 2009/0046563 A1    Feb. 19, 2009

(30) Foreign Application Priority Data

Aug. 16, 2007    (JP)    ............... 2007-212118

(51) Int. Cl.
   *G11B 7/00*    (2006.01)
(52) U.S. Cl. ..................... 369/94; 369/47.27
(58) Field of Classification Search ........... 369/94, 369/112.01, 44.25, 44.26, 47.1, 47.27, 126, 369/275.3, 59.25, 53.1
See application file for complete search history.

(56) References Cited

U.S. PATENT DOCUMENTS

2006/0077865 A1 *  4/2006  Eytan et al. ............... 369/125
2009/0154324 A1 *  6/2009  Sato et al. ............... 369/112.23

OTHER PUBLICATIONS

Saito, K. et al., "Drive system and readout characteristics of Micro-Reflector optical disc", Optical Society of America, 2006.

* cited by examiner

*Primary Examiner*—Nabil Z Hindi
(74) *Attorney, Agent, or Firm*—Finnegan Henderson Farabow Garrett & Dunner LLP

(57) ABSTRACT

An optical information recording and reproducing apparatus is provided for recording and/or reproducing information on an optical disc including a recording layer in which information can be recorded at recording positions each located at a different distance from a surface of the optical disc. The optical information recording and reproducing apparatus includes: a light source; and an objective lens which can converge the light flux from the light source onto one of the recording positions at a predetermined depth in the recording layer for recording information on the optical disc. When information to be recorded is recorded on one of the recording positions at a predetermined depth in the recording layer, the optical information recording and reproducing apparatus records information about the predetermined depth on one of the plurality of recording positions at the predetermined depth, with the information to be recorded.

2 Claims, 2 Drawing Sheets

OPTICAL INFORMATION RECORDING AND REPRODUCING APPARATUS

This application is based on Japanese Patent Application No. 2007-212118 filed on Aug. 16, 2007, in Japanese Patent Office, the entire content of which is hereby incorporated by reference.

TECHNICAL FIELD

The present invention relates to optical information recording and reproducing apparatuses that can record and/or reproduce information at recording positions in a recording layer each located at a different depth from the surface of an optical disc.

BACKGROUND

There have been developed an optical disc on which information can be recorded at different positions in the depth direction in its recording layer (See the document: K. Saito and S. Kobayashi, "Analysis of Micro-Reflector 3-D optical disc recording", IEICE Technical Report, Vol. 106, No. 248, CPM2006-82, pp. 19-23, September 2006). In the optical disc, information is recorded at a position with the desired depth utilizing the fact that a micro reflector (micro hologram) with a diffraction limit size is formed by converging two opposing light beams at the same focal point in a volume type recording medium.

When recording and/or reproducing information on the optical disc according to the document, the recording and/or reproducing position along the tracking direction can be read out by emitting a light flux for a servo operation upon the reference layer formed in the optical disc. Further, the depth position of the recording layer can be found from the distance of the recording layer from the reference layer. However, if some external disturbances such as vibrations occur while the information is being recorded or reproduced, the light flux will jump to a different depth position, whereby a recording or reproduction error may occur. In order to avoid this error, it is possible to consider returning the light flux to the first reference layer and then searching for the depth position. However, there is the problem that information recording/reproduction gets interrupted during the search and it takes time until the information recording/reproducing is restarted. In addition, when the optical information recording and reproducing apparatuses to record and/or reproduce information for that optical disc have individual differences, some optical information recording and reproducing apparatuses record information at recording positions at minutely different depth due to the individual difference. Therefore, the distance from the reference layer will not always be the same among the optical information recording and reproducing apparatuses, which is also a problem. Furthermore, when an optical information recording and reproducing apparatus makes random accesses to the optical disc, the optical information recording and reproducing apparatus needs to verify the location where the information to be read has been written.

SUMMARY

The present invention was made in view of these problems with conventional technology, and an object of the present invention is to provide an optical information recording and reproduction apparatus that can speedily record and/or reproduce information to or from an optical disc in which information can be recorded at a plurality of recording positions each located at a different depth in the recording layer.

One embodiment of the present invention is an optical information recording and reproducing apparatus for recording and/or reproducing information on an optical disc comprising a recording layer in which information can be recorded at a plurality of recording positions each of which is located at a different distance from a surface of the optical disc. The optical information recording and reproducing apparatus includes: a light source for emitting a light flux; and an objective lens. The objective lens can converge the light flux from the light source onto one of the plurality of recording positions at a predetermined depth in the recording layer for recording information on the optical disc. When information to be recorded is recorded on one of the plurality of recording positions at a predetermined depth in the recording layer, the optical information recording and reproducing apparatus records information about the predetermined depth on one of the plurality of recording positions at the predetermined depth, with the information to be recorded.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
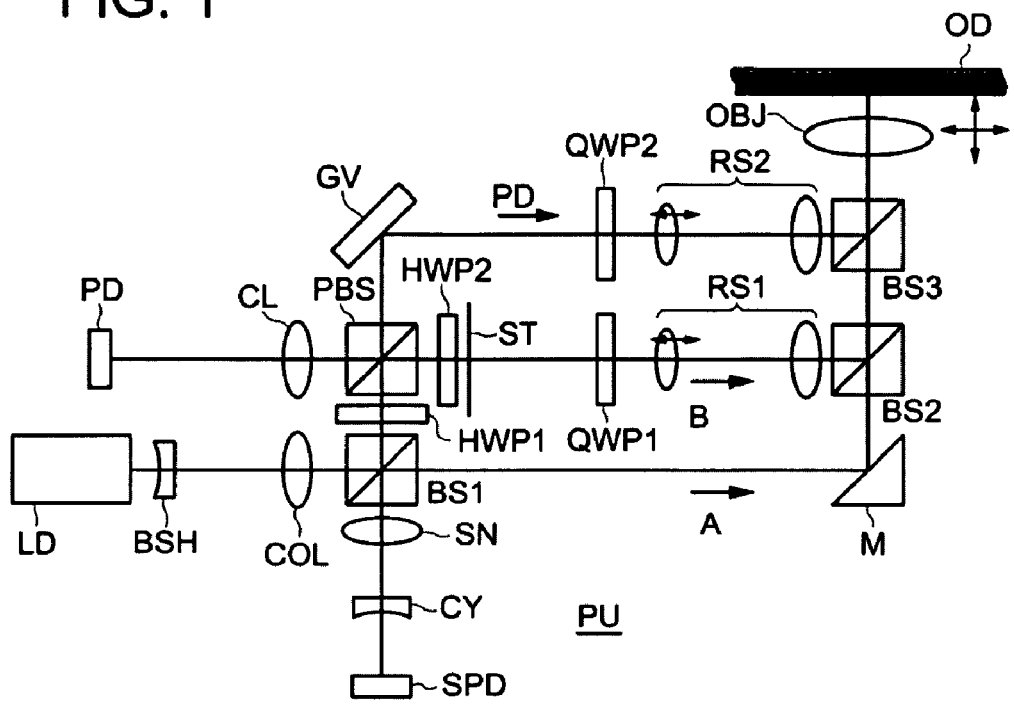
FIG. 1 is a diagram showing the outline configuration of an optical information recording and reproducing apparatus PU1.

As one preferred embodiment of the present invention, there is provided an optical information recording and reproducing apparatus for recording and/or reproducing information on an optical disc comprising a recording layer in which information can be recorded at a plurality of recording positions each of which is located at a different distance from a surface of the optical disc. The optical information recording and reproducing apparatus comprises: a light source for emitting a light flux; and an objective lens which can converge the light flux from the light source onto one of the plurality of recording positions at a predetermined depth in the recording layer for recording information on the optical disc. When information to be recorded is recorded on one of the plurality of recording positions at a predetermined depth in the recording layer, the optical information recording and reproducing apparatus records information about the predetermined depth on one of the plurality of recording positions at the predetermined depth, with the information to be recorded.

Further, as another preferred embodiment, there is provided an optical information recording and reproducing apparatus for recording and/or reproducing information on an optical disc comprising a reference layer and a recording layer in which information can be recorded at a plurality of recording positions each of which is located at a different distance from a surface of the optical disc. The optical information recording and reproducing apparatus comprises: a light source for emitting a light flux; and an objective lens which can converge the light flux from the light source onto the reference layer and one of the plurality of recording positions at a predetermined depth in the recording layer for recording information on the optical disc. When information to be recorded is recorded on one of the plurality of recording positions at a predetermined depth in the recording layer, the optical information recording and reproducing apparatus records information about the predetermined depth on one of the plurality of recording positions at the predetermined depth, with the information to be recorded.

According to the embodiments, when recording information at a recording position at a prescribed depth in the recording layer, the information related to that depth position is recorded with the information to be recoded. Therefore, even when the light flux from the light source has jumped to a different depth position during recording information due to, for example, an external disturbance such as vibrations, it allows the light to return immediately to the original depth position based on the stored information about the depth of the position, by storing the information of the depth of the recoding position at which the recording or reproduction was being made. Thus, it allows information recording or reproduction without delay. In addition, when the optical information recording and reproducing apparatus carries out random accesses to the optical disc, it is possible to confirm in advance the location where the information to be read out has been written. It allows the optical information recording and reproducing apparatus to carry out the reading information smoothly.

According to a concrete embodiment of the present invention, the recording layer may include a plurality of sectors and the optical information recording and reproducing apparatus may record the information about the predetermined depth on each of the plurality of sectors. It allows quick confirmation of the depth position.

Further, according to a concrete embodiment of the present invention, the light source may emit light fluxes with two wavelengths which differ from each other, and the objective lens may converge the light fluxes with one of the two wavelengths on the reference layer and converges the light flux with the other of the two wavelengths on one of the plurality of recording positions the recording layer. In the embodiment, light fluxes returning from the optical disc corresponding to the light fluxes of the respective wavelengths can be separated easily using an optical element such as a dichroic filter.

Further, it is preferable that after all the information has been recorded at recording positions at a predetermined depth in the recording layer, the optical information recording and reproducing apparatus may record information at another recording positions with a different depth. However, the present invention is not limited to that, and the optical information recording and reproducing apparatus may write information at another recording positions with a different depth after information has been written to a partial region of the recording positions with the predetermined depth.

According to the present embodiments, it is possible to provide an optical information recording and reproducing apparatus that can record and/or reproduce information quickly to or from an optical disc in which information can record at recording positions at different depths in the recording layer.

Figure 2:
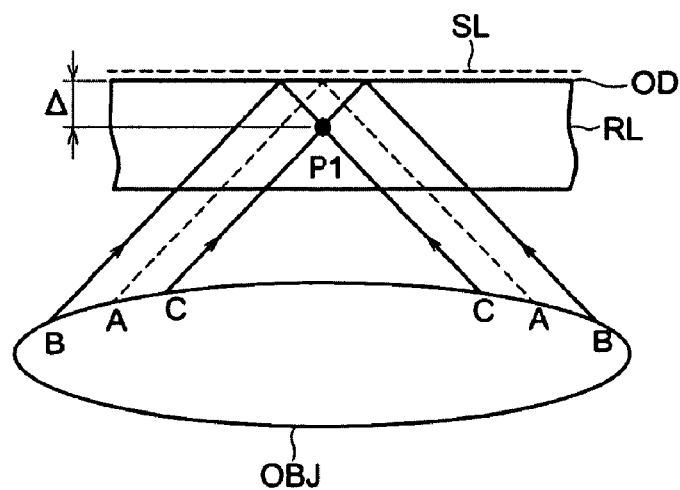
FIG. 2 is a diagram schematically showing a light flux that is converged onto the optical disc during recording information.

In the following, a preferred embodiment of the present invention is described referring to the drawings. An optical information recording and reproducing apparatus PU1 of the present embodiment can record and/or reproduce information to or from an optical disc OD that has a reference layer and a recording layer. The optical information recording and reproducing apparatus can record and/or reproduce information on an optical disc comprising a recording layer in which information can be recorded at a plurality of recording positions each of which is located at a different distance from a surface of the optical disc. FIG. 1 is a diagram showing the outline configuration of the optical information recording and reproducing apparatus PU1. FIG. 2 is a diagram showing schematically a light flux that is converged on to the optical disc during recording information.

When recording or reproducing information at a recording position P1 at a prescribed depth in the recording layer of the optical disc OD, a first relay lens RS1 and a second relay lens RS2 are set to the prescribed positions along the optical axis. To begin with, the light flux emitted from a semiconductor laser LD passes through beam shaper BSH and collimator COL, and is split into two light fluxes by first beam splitter BS1.

A light flux (A) that has passed through the first beam splitter BS1, is reflected by mirror M, and passes through second beam splitter BS2 and third beam splitter BS3. Then, as is shown by the broken line in FIG. 2, the light flux is converged by the objective lens OBJ onto the reference layer SL after passing through the recording layer RL of the optical disc OD. The light flux (A) is reflected by the reference layer SL and passes through the third beam splitter BS3 and the second beam splitter BS2. The light flux (A) is reflected by the mirror M and the first beam splitter BS1, and is received by the servo-photodetector SPD through a sensor lens SN and a cylindrical lens CY. After that, the tracking position is detected.

On the other hand, the light flux reflected by the first beam splitter BS1, passes through first half-wavelength plate HWP1 and is divided into two light fluxes by the polarizing beam splitter PBS. A light flux (B) reflected by the polarizing beam splitter PBS passes through second half-wavelength plate HWP2, shutter ST, first quarter-wavelength plate QWP1, and first relay lens RS1. Then, the light flux (B) is reflected by the second beam splitter BS2, and passes through the third beam splitter BS3. Then, as is shown by the continuous line (B) in FIG. 2, the light flux travels through the objective lens OBJ towards the reference layer SL of the optical disc OD, and is reflected there.

In contrast with this, the light flux (C) that has passed through the polarizing beam splitter PBS is reflected by galvano mirror GV for adjusting the tracking position. The galvano mirror GV is driven by the signal from the servo-photodetector SPD. The reflected light flux passes through the second quarter-wavelength plate QWP2 and the second relay lens RS2, and is reflected by the third beam splitter BS3. Then, as is shown by the continuous line (C) in FIG. 2, the light flux travels through the objective lens OBJ towards the reference layer SL which is positioned at the surface of the optical disc OD, and is reflected there. The light flux (B) and the light flux (C) at this time intersect and interfere with each other at a recording position P in the recording layer RL located at a prescribed distance $\Delta$ in the depth direction from the reference layer SL. It allows writing information at the recording position P at the predetermined depth.

Further, when closing the shutter ST, the light flux (B) is not converged on the optical disc OD and the interference of the light flux (B) and the light flux (C) does not occur. Therefore, information is not recorded. Instead, information is reproduced from the optical disc OD. In this case, the light flux (C) that has passed through pits formed at the position P at the predetermined depth is reflected by the third beam splitter BS3, and passes through the second relay lens RS2 and the second quarter wavelength plate QWP2. Then, the light flux is reflected by the galvano mirror GV and the polarizing beam splitter PBS, and passes through the coupling lens CL. At last, the light flux enters the photodetector PD for information recording/reproduction. After that, information is recorded/reproduced. It is also possible to monitor (verify) recording signal by picking up the signal on the photodetector PD for recording/reproduction information during recording information.

When recording/reproducing information for a recording position P2 in the recording layer of the optical disc OD located at a predetermined depth that has different depth from the recording position P1, the positions along the optical axis of the first relay lens RS1 and the second relay lens RS2 are changed. It changes the position where a light flux converges, and it is possible to record the information at the recoding position P2 at the different depth.

Figure 3:
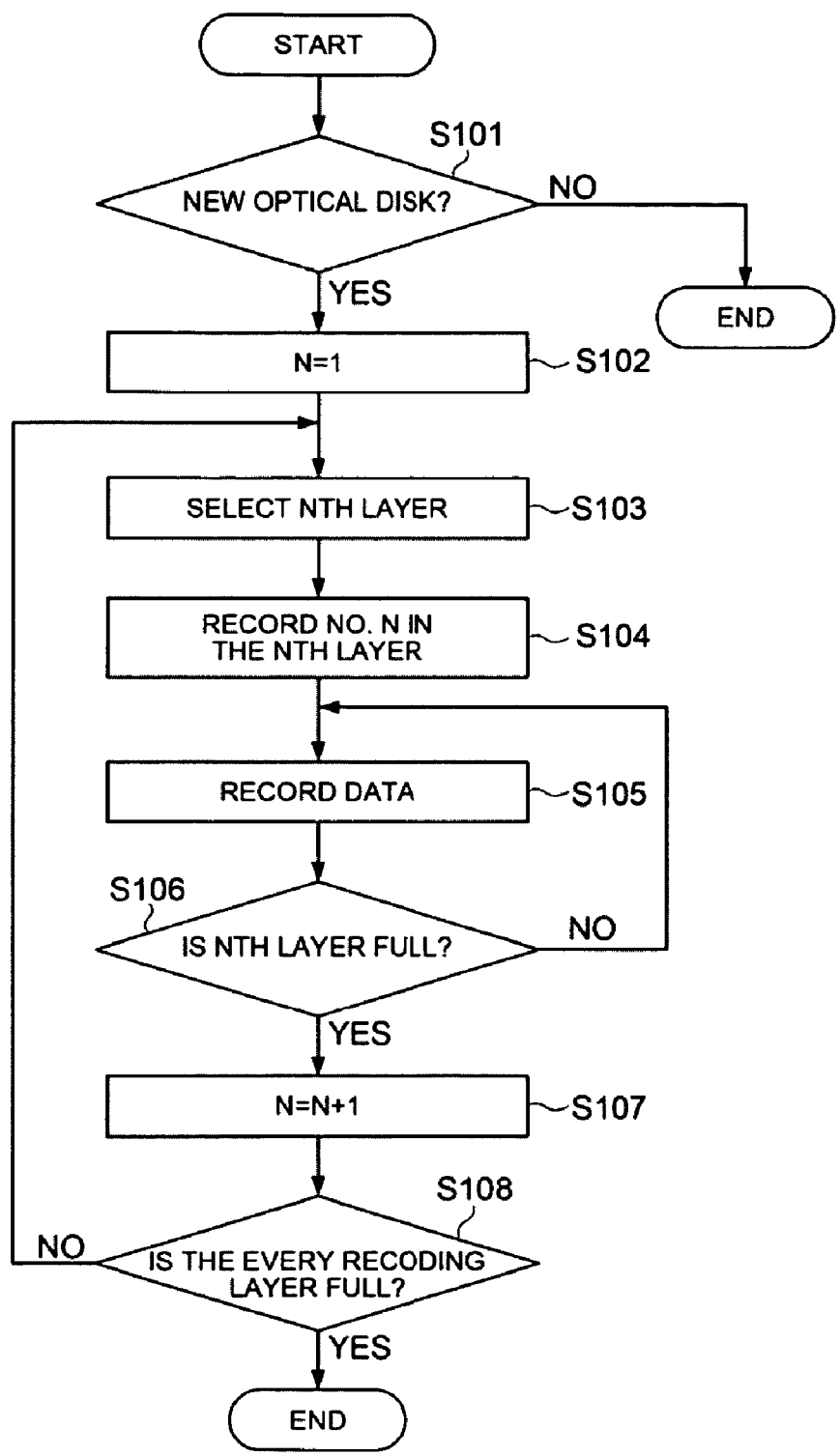
FIG. 3 is a diagram showing the recording sequence of an optical information recording and reproducing apparatus according to the present embodiment.

FIG. 3 is a diagram showing the recording sequence of an optical information recording and reproducing apparatus according to the present embodiment. In this embodiment, the sequence at the time of recording information for a new optical disc is explained. The recording positions are sequentially named such that a recording position closest to the reference layer is a first layer, a recording position secondary closest to the reference layer is a second layer, and so on. It is preferable that the information that has been recorded once on a recording position is no longer rewritten.

In Step S101 of FIG. 3, whether the optical disc set in the optical information recording and reproducing apparatus is a new one or not, is judged. If it is not a new one, this sequence is ended since information about depth of the recording positions would already have been written to it. On the other hand, if the optical disc set in the optical information recording and reproducing apparatus is a new one, N is set to 1 in Step S102. Then, the first layer is selected in Step S103, and the information "No. 1" as the depth information is written in this first layer in Step S104. Next, the data that should normally be recorded on the optical disc is recorded in the first layer in Step S105. In Step S106, whether the first layer is fully recorded is judged. If the first layer leaves a room where more information can be recorded, the operation returns to Step S105 to continue the recording for the first layer.

On the other hand, if the first layer becomes full, N is set to N+1 in Step S107, and in addition, whether the each of recording layers is full in Step S108. However, it is not necessary that each recording layer is full. If there are still some layers that can be recorded, the operation returns to Step S103. After selecting the second layer in Step S104, the information "No. 2", as depth information of the recording position is written in this first layer, and the recording is continued in a similar manner. At this time, in case that the recording on the previously recorded layer ends at the outermost side in the radial direction of the optical disc, it is preferable that the recording to the next layer starts from the outermost side in the radial direction of the optical disc. By repeating the above steps, information can be recorded in a plurality of layers until the every recording layer becomes full.

Eventually, if it is judged that the every recording layer has been fully recorded in Step S108, the recording sequence is ended.

According to the present embodiment, at the time of recording information at a recording position located at the prescribed depth in the recording layer, the information about depth of the recording position (for example, No. 1, etc.) is recorded in the recording layer with the information to be recorded. Therefore, during information is recorded or reproduced for the optical disc, the optical information recording reproducing apparatus can store the information about depth of the recording position (the first layer) where information has been recorded or reproduced in advance. Even in cases where the light flux from the semiconductor laser LD jumps to a different depth position due to an external disturbance such as a vibration that has occurred during the recording or reproduction of information, the light flux can return immediately to the original depth position (the first layer) based on the stored information about the depth of the recording position. It allows the optical information recording and reproducing apparatus to record or reproduce information without delay. Further, the information about depth of the recording position may be recorded at the time of formatting the optical disc.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein. For example, when the recording layer includes a plurality of sectors and the information about depth of the recording position is recorded in each sector, the recording layer can be found quickly at the time when the light flux for recording or reproducing information jumps between recording layers. Further, it is also possible to store in advance the ROM data such as the spacing of the recording positions in the depth direction, the application, and the driver, in the reference layer, and to make the optical information recording and reproduction apparatus read out this information at the time of the first access and carry out the prescribed operations. In addition, the above embodiment employs a single semiconductor laser as the light source. However, it may employ two semiconductor lasers to emit the light flux A, and light fluxes B and C respectively if interferences do not occur.

What is claimed is:

1. An optical information recording and reproducing apparatus for recording and/or reproducing information on an optical disc comprising a reference layer and a recording layer in which information can be recorded at a plurality of recording positions each of which is located at a different distance from a surface of the optical disc, the optical information recording and reproducing apparatus comprising:

a light source for emitting a light flux; and
an objective lens which can converge the light flux from the light source onto the reference layer and one of the plurality of recording positions at a predetermined depth in the recording layer for recording information on the optical disc,
wherein when information to be recorded is recorded on one of the plurality of recording positions at a predetermined depth in the recording layer, the optical information recording and reproducing apparatus records information about the predetermined depth on one of the plurality of recording positions at the predetermined depth, with the information to be recorded.

2. The optical information recording and reproducing apparatus of claim 1,
   wherein the light source emits light fluxes with two wavelengths which differ from each other, and
   the objective lens converges the light fluxes with one of the two wavelengths on the reference layer and converges the light flux with the other of the two wavelengths on one of the plurality of recording positions the recording layer.

* * * * *